(12) United States Patent
Wu et al.

(10) Patent No.: US 7,755,028 B2
(45) Date of Patent: Jul. 13, 2010

(54) OPTICAL SCANNING DEVICE WITH ADJUSTABLE GLASS PLATFORM

(75) Inventors: Shao-Yang Wu, Hsinchu (TW); Yueh-Shing Lee, Hsinchu (TW); Wen-Sheng Liu, Hsinchu (TW)

(73) Assignee: Foxlink Image Technology Co., Ltd., Hsinchu (TW)

( * ) Notice: Subject to any disclaimer, the term of this patent is extended or adjusted under 35 U.S.C. 154(b) by 95 days.

(21) Appl. No.: 12/018,164

(22) Filed: Jan. 22, 2008

(65) Prior Publication Data

US 2009/0185238 A1    Jul. 23, 2009

(51) Int. Cl.
*H04N 1/04* (2006.01)

(52) U.S. Cl. .................. 250/234; 250/239; 348/376; 358/505

(58) Field of Classification Search .......... 250/234, 250/235, 239, 208.1; 348/376; 358/505, 358/506
See application file for complete search history.

(56) References Cited

U.S. PATENT DOCUMENTS 6,040,572 A * 3/2000 Khovaylo et al. .......... 250/235
6,172,360 B1 * 1/2001 Khovaylo et al. .......... 250/235

\* cited by examiner

*Primary Examiner*—Seung C Sohn
(74) *Attorney, Agent, or Firm*—WPAT, P.C.; Anthony King

(57) ABSTRACT

An optical scanning device with a dustproof function includes a shell defining a first receiving room and a second receiving room communicating with the first receiving room through an open window defined on the shell for scanning light beams passing therethrough. An optical scanning module is mounted in the first receiving room. A glass platform is located on the second receiving room at a position facing the open window for insulating the first receiving room from the outside of the shell. A correcting plate is stuck on the bottom of the glass platform. Such structure of the optical scanning device enables the glass platform to be firstly assembled with the shell in a dustless chamber, which prevents the suspending dust from falling in the first receiving room and attaching to the optical scanning module during the subsequent assembly process and ensures the scanning quality of the optical scanning device.

12 Claims, 6 Drawing Sheets

OPTICAL SCANNING DEVICE WITH ADJUSTABLE GLASS PLATFORM

BACKGROUND OF THE INVENTION

1. Field of the Invention

The present invention relates to an optical scanning device, and more particularly to an optical scanning device with a dustproof function used in a scanner, an electrograph or the like.

2. The Related Art

Nowadays, an image manipulation device such as a scanner, an electrograph or the like is widely used by people in their daily life and work. The image manipulation device is provided with an optical scanning device for getting image information and further inputting the image information into a computer.

Referring to FIG. 1, a conventional double-side scanning device 30 is shown. The double-side scanning device 30 includes a lower cover 301 and an upper cover 302. A first optical mechanism 5 is disposed beneath the lower cover 301 and a second optical mechanism 6 is disposed above the upper cover 302. The first optical mechanism 5 and the second optical mechanism 6 respectively include a shell 51, 61. The shell 51, 61 defines a receiving room 511, 611 for accepting an optical scanning module 52, 62 and a window 512, 612 for scanning light beams passing therethrough. The lower cover 301 and the upper cover 302 respectively mount a glass platform 53, 63 thereon facing the window 512, 612. Two correcting plates 54, 64 are respectively arranged on the upper cover 302 and the lower cover 301 for correcting the image white of the first and second optical mechanisms 5, 6. The correcting plate 54 disposed on the upper cover 302 faces the glass platform 53 mounted on the lower cover 301 and the window 512 defined on the shell 51 of the first optical mechanism 5. The other correcting plate 64 disposed on the lower cover 301 faces the glass platform 63 mounted on the upper cover 302 and the window 612 defined on the shell 61 of the second optical mechanism 6.

It can be seen that the glass platforms 53, 63 are formed apart from the shells 51, 61. Therefore, when the double-side scanning device 30 is assembled, and especially when the first optical mechanism 5 is disposed beneath the lower cover 301 and the second optical mechanism 6 is disposed above the upper cover 302, the suspending dust is easy to fall in the receiving rooms 511, 611 of the shells 51, 61 and attach to the optical scanning modules 52, 62, which brings a bad influence on the scanning quality of the double-side scanning device 30. For example, straight stripes are easily formed on the image. Besides, because the two correcting plates 54, 64 are respectively arranged on the upper cover 302 and the lower cover 301 to cooperate with the first and second optical mechanisms 5, 6, the first and second optical mechanisms 5, 6 have a far distance therebetween along the scanning direction, so that a short document is hard to be scanned, which limits the use of the double-side scanning device 30. Furthermore, because the glass platforms 53, 63 are correspondingly mounted on the lower cover 301 and the upper cover 302, and the lower cover 301 and the upper cover 302 are respectively fixed, then the vertical distance between the lower cover 301 and the upper cover 302 is decided and hard to be adjusted, so the double-side scanning device 30 just scans a document with special thickness.

SUMMARY OF THE INVENTION

Accordingly, an object of the present invention is to provide an optical scanning device with a dustproof function.

To achieve the object, the optical scanning device includes a shell. The shell defines a first receiving room and a second receiving room communicating with the first receiving room through an open window defined on the shell for scanning light beams passing therethrough. An optical scanning module is mounted in the first receiving room of the shell for converting an optical signal into a digital signal. A glass platform is located on the second receiving room of the shell at a position facing the open window for insulating the first receiving room from the outside of the shell. A correcting plate is stuck on the bottom of the glass platform.

As described above, the structure of the optical scanning device enables the glass platform firstly to be integrally assembled with the shell in a dustless chamber, which prevents the suspending dust from falling in the first receiving room of the shell and attaching to the optical scanning module during the subsequent assembly process and ensures the scanning quality of the optical scanning device.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
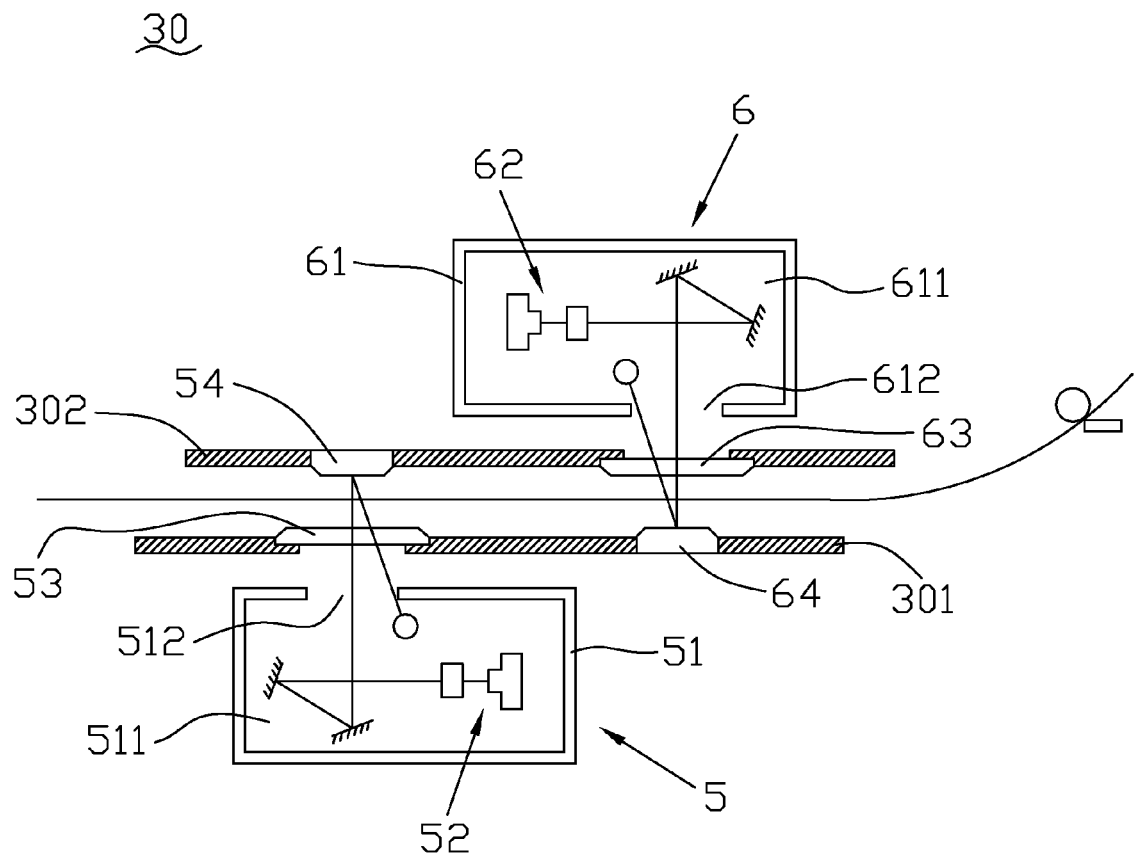
FIG. 1 is a schematic view of a prior double-side scanning device.
Figure 2:
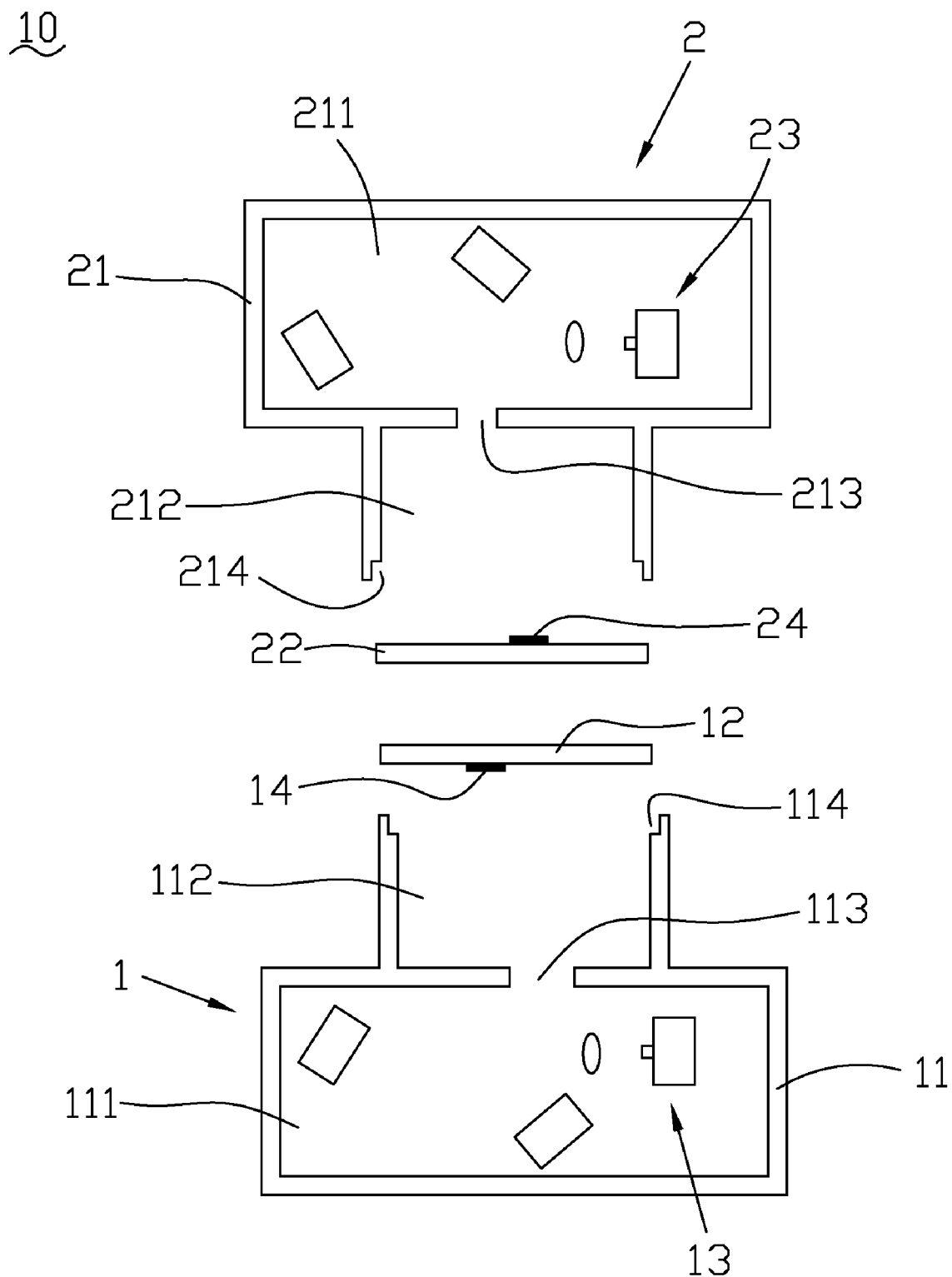
FIG. 2 is a schematic view of an optical scanning device of a first embodiment of the present invention of which glass platforms are removed from shells.
Figure 3:
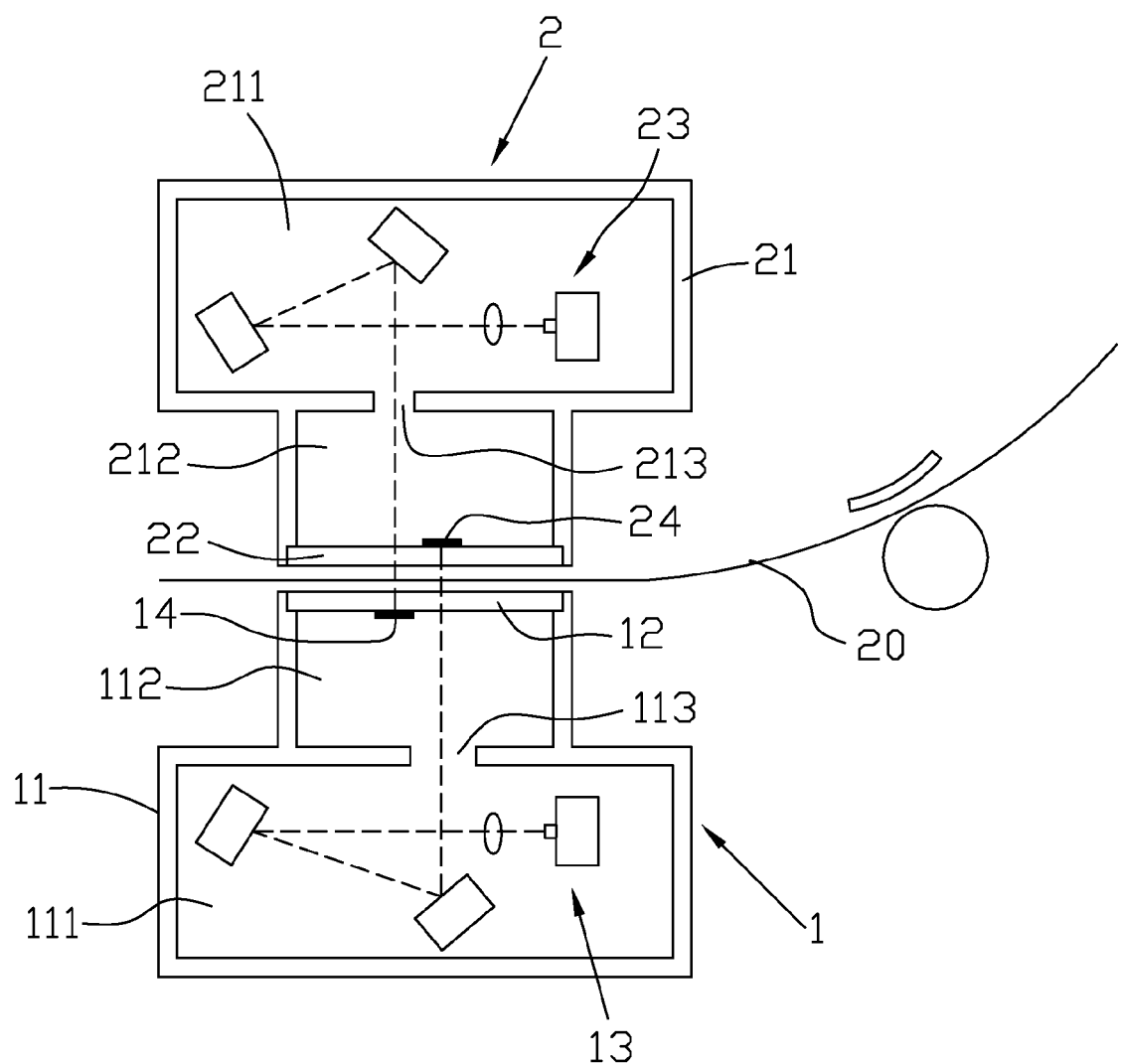
FIG. 3 is a schematic view of the optical scanning device of the first embodiment of the present invention.

Referring to FIG. 2 to FIG. 3 showing a first preferred embodiment of the present invention, an optical scanning device is used in a double-side scanner 10 capable of scanning both sides of a document at the same time. The double-side scanner 10 includes a first optical scanning device 1 and a second optical scanning device 2. The first optical scanning device 1 and the second optical scanning device 2 have the same structure. The second optical scanning device 2 is inversely disposed above the first optical scanning device 1 and faces the first optical scanning device 1.

Please refer to FIG. 2 continually. The two optical scanning devices 1, 2 respectively include a shell 11, 21. The shell 11, 21 defines a first receiving room 111, 211 for accommodating an optical scanning module 13, 23. In the first preferred embodiment, the optical scanning modules 13, 23 are a charge coupled device (CCD) used to convert an optical signal into a digital signal. The shell 11, 21 defines a second receiving room 112, 212 disposed on the top of the first receiving room 111, 211. The shell 11, 21 defines an open window 113, 213 connecting the first receiving room 111, 211 and the second receiving room 112, 212 for scanning light beams passing therethrough. An inner side of the top of the second receiving room 112, 212 defines a locating groove 114, 214. Two glass platforms 12, 22 are respectively mounted in the locating grooves 114, 214. The two glass platforms 12, 22 are on the same vertical line and face to each other. The two glass platforms 12, 22 are separated apart from each other to form a passage therebetween for the document passing therethrough. A correcting plate 14, 24 is located on the bottom of the glass platform 12, 22 and received in the second receiving room 112, 212. The correcting plate 14 of the first optical scanning device 1 faces the open window 213 of the second optical scanning device 2, and the correcting plate 24 of the second optical scanning device 2 faces the open window 113 of the first optical scanning device 1. The way to locate the correcting plate 14, 24 on the bottom of the glass platform 12, 22 can use adhesive, glue or the like.

Referring to FIG. 3, in assembly, firstly the glass platforms 12, 22 are respectively stuck in the locating grooves 114, 214 of the shells 11, 21 in a dustless chamber using such as adhesive, glue or the like for insulating the first receiving rooms 111, 211 from the outside of the shells 11, 21. Then, the focal length and the image white of the double-side scanner 10 are adjusted. The scanning light beams of the first optical scanning device 1 pass through the open window 113 and the glass platform 12 of the first optical scanning device 1 and further pass through the glass platform 22 of the second optical scanning device 2 and at last reach the correcting plate 24 of the second optical scanning device 2. The scanning light beams of the second optical scanning device 2 pass through the open window 213 and the glass platform 22 of the second optical scanning device 2 and further pass through the glass platform 12 of the first optical scanning device 1 and at last reach the correcting plate 14 of the first optical scanning device 1.

Figure 4:
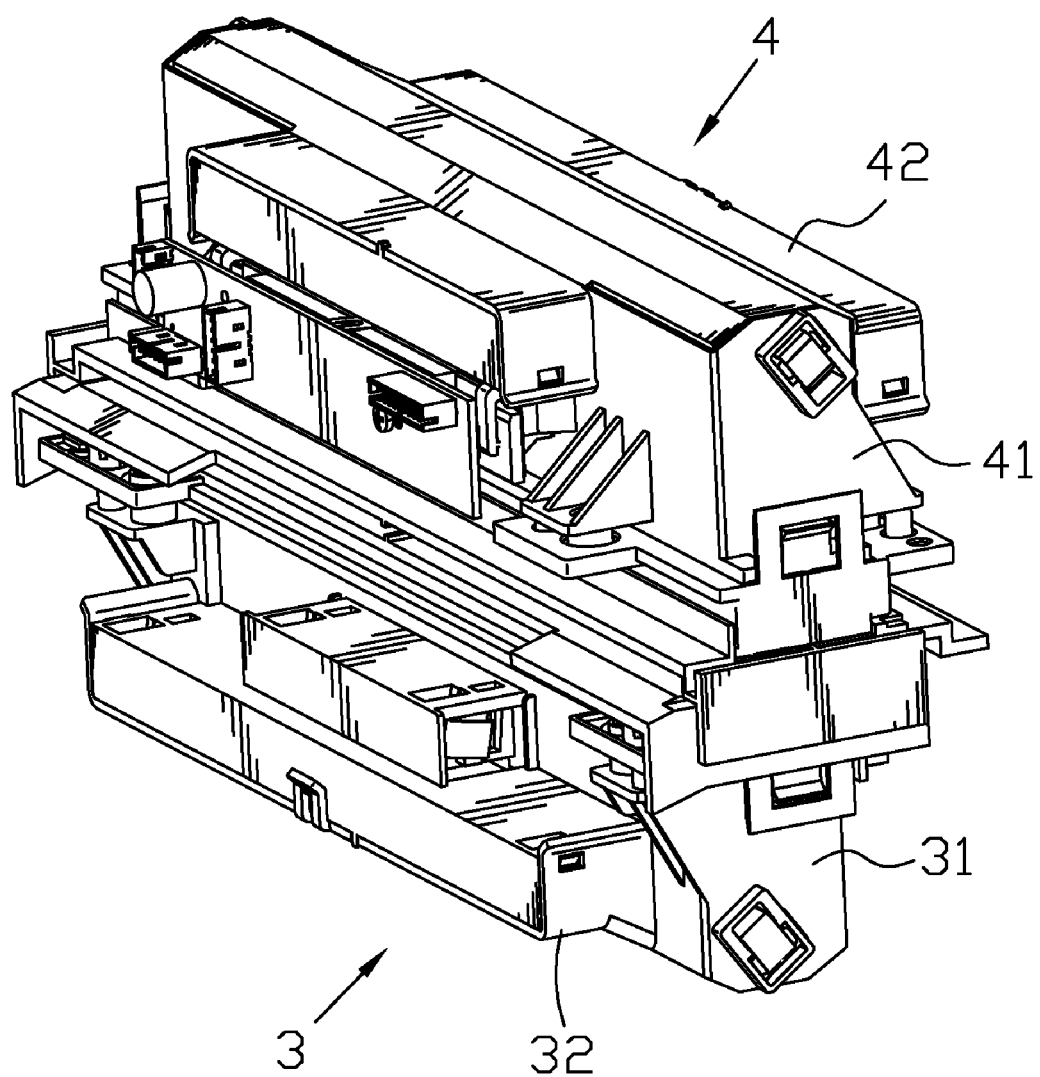
FIG. 4 is a perspective view of an optical scanning device of a second embodiment of the present invention.
Figure 5:
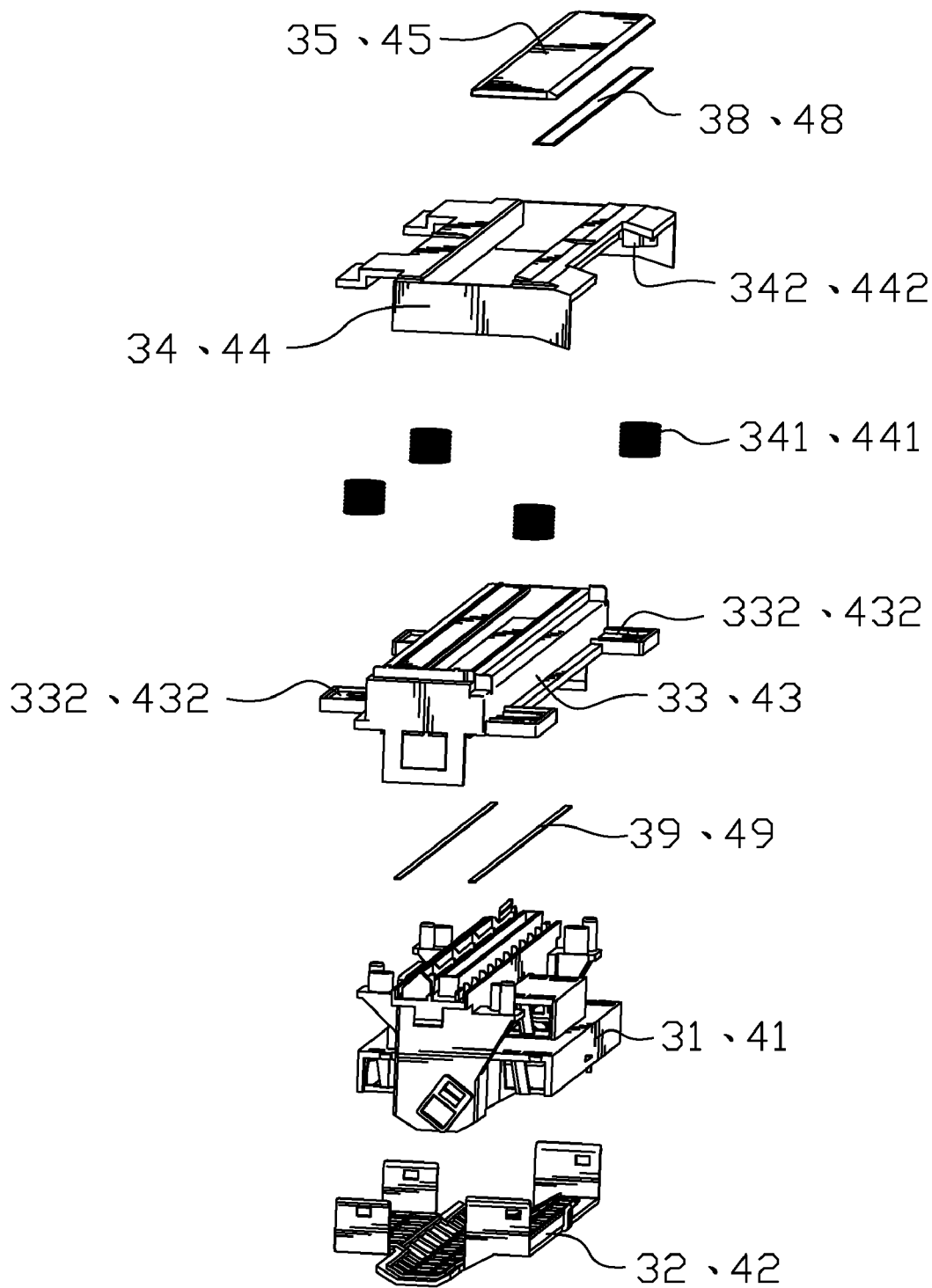
FIG. 5 is an exploded view of the optical scanning device of the second embodiment of the present invention.
Figure 6:
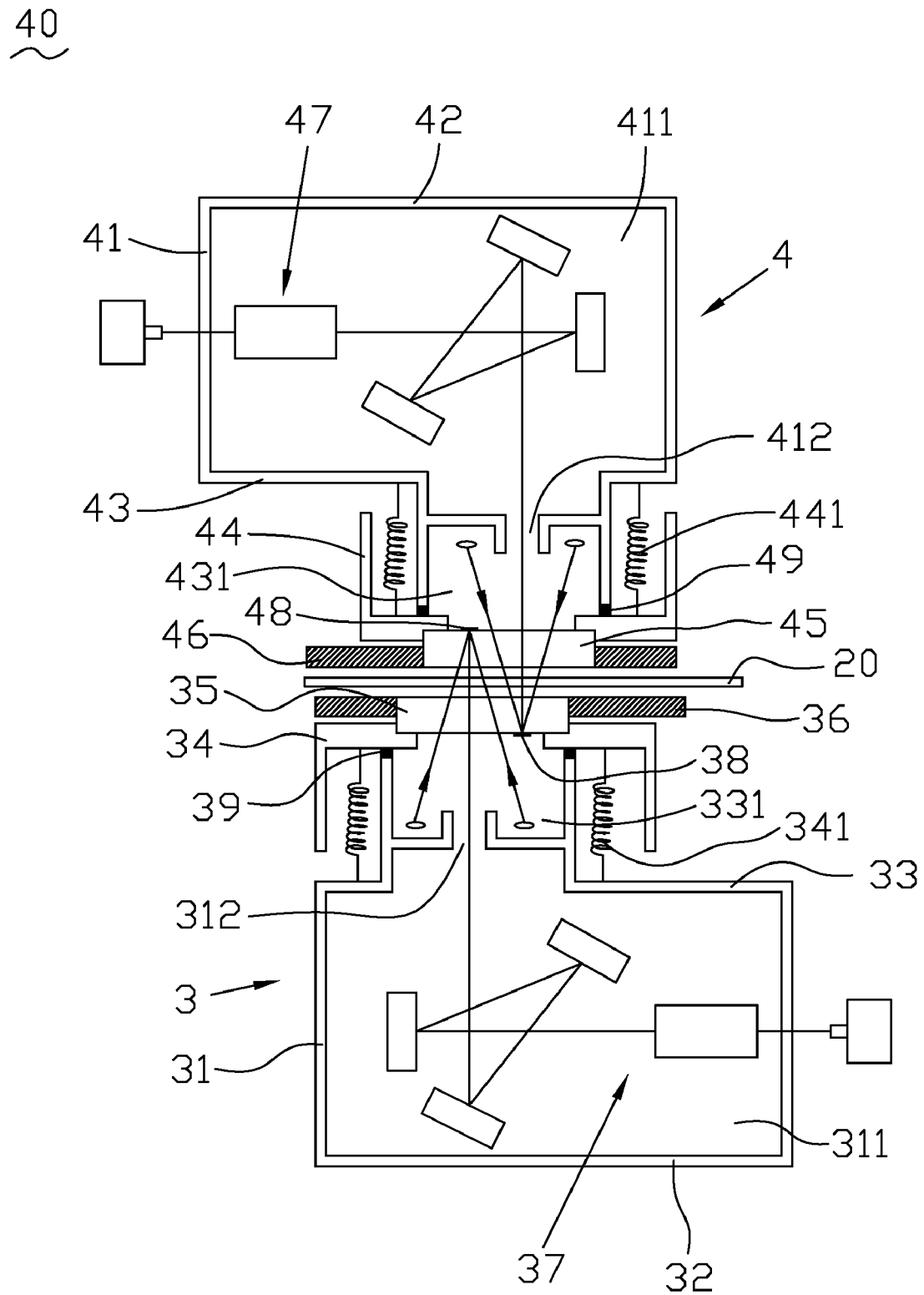
FIG. 6 is a schematic view of the optical scanning device of the second embodiment of the present invention.

With reference to FIG. 4 to FIG. 6 showing a second preferred embodiment of the present invention, an optical scanning device is used in a double-side scanner 40 capable of scanning both sides of a document at the same time. The double-side scanner 40 includes a first optical scanning device 3 and a second optical scanning device 4. The first optical scanning device 3 and the second optical scanning device 4 have the same structure. The second optical scanning device 4 is inversely disposed above the first optical scanning device 3 and faces the first optical scanning device 3.

Please refer to FIG. 5 and FIG. 6. The first optical scanning device 3 and the second optical scanning device 4 respectively include a shell 31, 41. The bottom of the shell 31, 41 disposes a lower cover 32, 42 for shielding the bottom of the shell 31, 41. The shell 31, 41 defines a first receiving room 311, 411 for receiving an optical scanning module 37, 47. In the second preferred embodiment, the optical scanning module 37, 47 is a charge coupled device (CCD) used to convert an optical signal into a digital signal.

A loading frame 33, 43 is mounted on the top of the shell 31, 41. The loading frame 33, 43 defines a second receiving room 331, 431 communicating with the first receiving room 311, 411 through an open window 312, 412 defined on the shell 31, 41. The open window 312, 412 is used for scanning light beams passing therethrough. An upper cover 34, 44 is covered on the top of the loading frame 33, 43 and an elastic member 39, 49 is disposed between the upper cover 34, 44 and the loading frame 33, 43 for connecting the upper cover 34, 44 and the loading frame 33, 43. The elastic member 39, 49 is capable of expanding and contracting for increasing or decreasing the space between the two upper covers 34, 44 when the load of the loading frames 33, 43 is decreased or increased. In the second preferred embodiment, the elastic members 39, 49 are of foam material, the elastic members 39, 49 are stuck with the upper covers 34, 44 and the loading frames 33, 43 using such as adhesive, glue or the like.

The top of the upper cover 34, 44 disposes a glass platform 35, 45 at center. The two glass platforms 35, 45 are on the same vertical line and face to each other. The two glass platforms 35, 45 are separated apart from each other to form a passage therebetween for the document passing therethrough. The bottom of the glass platform 35, 45 sticks a correcting plate 38, 48 through adhesive, glue or the like. A sheathing 36, 46 is mounted on the top of the upper cover 34, 44 for locating the glass platform 35, 45.

In the second preferred embodiment of the present invention, the loading frame 33, 43 protrudes outward to form four supporting plates 332, 432 at four corners thereof. Correspondingly, the upper cover 34, 44 protrudes downward to form four locating pillars 342, 442 at four corners thereof. An elastic element 341, 441 is disposed between the loading frame 33, 43 and the upper cover 34, 44. An end of the elastic element 341, 441 is put around the locating pillar 342, 442, and an opposite end of the elastic element 341, 441 is against the supporting plate 332, 432. The elastic element 341, 441 is a spring in the second preferred embodiment for driving the upper cover 34, 44 moving upward or downward to change the space between the two upper covers 34, 44, and then the space between the two glass platforms 35, 45 is changed for carrying documents with different thickness.

Please refer to FIG. 6 continually. In assembly, the shell 31, 41, the loading frame 33, 43 and the upper cover 34, 44 are integrally assembled together in a dustless chamber. The glass platform 35, 45 is located on the top of the upper cover 34, 44 in the dustless chamber for insulating the first receiving room 311, 411 from the outside of the shell 31, 41. The elastic element 341, 441 is disposed between the loading frame 33, 43 and the upper cover 34, 44. Then, the focal length and the image white of the double-side scanner 40 are adjusted. The scanning light beams of the first optical scanning device 3 pass through the open window 312 and the glass platform 35 of the first optical scanning device 3 and further pass through the glass platform 45 of the second optical scanning device 4 and at last reach the correcting plate 48 of the second optical scanning device 4. The scanning light beams of the second optical scanning device 4 pass through the open window 412 and the glass platform 45 of the second optical scanning device 4 and further pass through the glass platform 35 of the first optical scanning device 3 and at last reach the correcting plate 38 of the first optical scanning device 3.

As described above, in the two preferred embodiments of the present invention, the glass platforms 12, 22, 35, 45 are firstly respectively assembled with the shells 11, 21, 31, 41 in the dustless chamber for insulating the first receiving rooms 111, 211, 311, 411 from the outside of the shells 11, 21, 31, 41. Then, the focal length and the image white of the double-side scanners 10, 40 are adjusted. The design of the present invention prevents the suspending dust from falling in the first receiving rooms 111, 211, 311, 411 of the shells 11, 21, 31, 41 and attaching to the optical scanning modules 13, 23, 37, 47, which ensures the scanning quality of the double-side scanners 10, 40. At the same time, because the correcting plates 14, 24, 38, 48 are respectively stuck on the bottom of the glass platforms 12, 22, 35, 45, the scanning distance between document carrying wheels of the first and second optical scanning devices 1, 2, 3, 4 is shorten, and then a short document is easy to be scanned.

Besides, in the second preferred embodiment of the present invention, the vertical distance between the glass platforms 35, 45 is easy to be adjusted through the elastic members 39, 49 and the elastic elements 341, 441 disposed between the loading frame 33, 43 and the upper cover 34, 44 for scanning documents with different thickness.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. An optical scanning device with an adjustable glass platform, comprising:
    a shell defining a receiving room and an open window for scanning light beams passing therethrough;
    an optical scanning module mounted in the receiving room of the shell;
    a loading frame engaged with the top of the shell;
    an upper cover covered on the top of the loading frame;
    an elastic member capable of expanding or contracting, the elastic member being stuck between the upper cover and the loading frame and connecting the upper cover and the loading frame;
    a glass platform located on the upper cover at a position facing the open window for insulating the receiving room from the outside of the shell; and
    a sheathing mounted on the upper cover for locating the glass platform;
    wherein the glass platform located on the upper cover is moved upwardly or downwardly and the elastic member is adjusted according to the load of the loading frame.

2. The optical scanning device as claimed in claim 1, wherein the bottom of the shell disposes a lower cover for shielding the bottom thereof.

3. The optical scanning device as claimed in claim 1, wherein the elastic member is of foam material.

4. The optical scanning device as claimed in claim 1, wherein the optical scanning module is a charge coupled device used to convert an optical signal into a digital signal.

5. The optical scanning device as claimed in claim 1, further comprising a correcting plate stuck on the bottom of the glass platform.

6. The optical scanning device as claimed in claim 1, wherein the loading frame protrudes outward to form supporting plates, the upper cover protrudes downward to form locating pillars, an elastic element is disposed between the loading frame and the upper cover, an end of the elastic element is put around the locating pillar and an opposite end of the elastic element is against the supporting plate for driving the upper cover moving upward or downward.

7. An optical scanning device with an adjustable glass platform adapted to be used in a double-side scanner, comprising:
    a first optical scanning device and a second optical scanning device inversely disposed above the first optical scanning device, the two optical scanning devices facing each other, each of the optical scanning devices including:
    a shell defining a first receiving room and an open window for scanning light beams passing therethrough;
    a loading frame mounted on the shell and defining a second receiving room communicating with the first receiving room through the open window;
    an optical scanning module mounted in the first receiving room of the shell;
    an upper cover covered on the loading frame;
    an elastic member capable of expanding or contracting, the elastic member being disposed between the upper cover and the loading frame and connecting the upper cover and the loading frame;
    a glass platform located on the upper cover at a position facing the open window for insulating the first receiving room from the outside of the shell; and
    a sheathing mounted on the upper cover for locating the glass platform;
    wherein a space between the glass platform located on the upper cover of the first optical scanning device and the glass platform located on the upper cover of the second optical scanning device is adjusted according to at least one of the elastic member and loads of the loading frames of the two optical scanning devices.

8. The optical scanning device as claimed in claim 7, wherein the bottom of the shell disposes a lower cover for shielding the bottom thereof.

9. The optical scanning device as claimed in claim 7, wherein the optical scanning module is a charge coupled device used to convert an optical signal into a digital signal.

10. The optical scanning device as claimed in claim 7, wherein the elastic member is of foam material.

11. The optical scanning device as claimed in claim 7, wherein each of the optical scanning devices further comprises a correcting plate stuck on the bottom of the glass platform, the correcting plate of the first optical scanning device faces the open window of the second optical scanning device, and the correcting plate of the second optical scanning device faces the open window of the first optical scanning device.

12. The optical scanning device as claimed in claim 7, wherein the loading frame protrudes outward to form supporting plates, the upper cover protrudes downward to form locating pillars, an elastic element is disposed between the loading frame and the upper cover, an end of the elastic element is put around the locating pillar and an opposite end of the elastic element is against the supporting plate for driving the upper cover moving upward or downward.

* * * * *